United States Patent
Tomaru et al.

(10) Patent No.: US 6,361,828 B1
(45) Date of Patent: Mar. 26, 2002

(54) COATING METHOD FOR FORMING A THIN, STABLE AND UNIFORM FILM

(75) Inventors: Mikio Tomaru; Kazunori Komatsu, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/499,756

(22) Filed: Feb. 8, 2000

(30) Foreign Application Priority Data

Feb. 9, 1999 (JP) .......................................... 11-031671

(51) Int. Cl.[7] ................................................. B05D 3/12
(52) U.S. Cl. ........................ 427/356; 118/410; 118/411
(58) Field of Search ......................... 427/356; 118/410, 118/411

(56) References Cited

U.S. PATENT DOCUMENTS 4,521,459 A * 6/1985 Takeda ........................ 427/359
4,537,801 A * 8/1985 Takeda ........................ 427/356
5,318,804 A * 6/1994 Yoshida ....................... 427/356
5,582,870 A * 12/1996 Shigesada et al. .......... 427/358

FOREIGN PATENT DOCUMENTS

JP 9-57181 * 3/1997

* cited by examiner

Primary Examiner—Katherine A. Bareford
(74) Attorney, Agent, or Firm—Sughrue Mion, PLLC

(57) ABSTRACT

In a coating method, a coating film is provided in the state where 10 to 80% of the discharge amount of a first coating composition is made to overflow through a gap formed between an above-mentioned support and an above-mentioned front edge surface. Accordingly, even if the amount of the overflow of the first coating composition is reduced to a minimum requirement, not only unsteady vibration causing coating unevenness failure is restrained from being generated but also the entrained air and foreign matters to a web are effectively prevented from invading the coating film, so that the coating film can be kept in an extremely stable state, and the thickness of the coating film can be reduced.

8 Claims, 6 Drawing Sheets

COATING METHOD FOR FORMING A THIN, STABLE AND UNIFORM FILM

FIELD OF THE INVENTION

The present invention relates to a coating method for forming at least one layer of coating film on the surface of a continuously conveyed long-size flexible band-like support by use of an extrusion-type coating apparatus.

DESCRIPTION OF THE RELATED ART

Recently, in the fields of coating magnetic recording media or the like, studies and various proposals for applying a thin functional layer at a high speed have been made with the improvement of product performance.

For example, JP-B-4-5508, JP-B-5-8065 or the like discloses a coating method in which an extrusion-type coating head is pressed onto a flexible support.

FIG. 6 is a schematic view of a main part of an apparatus corresponding to a coating apparatus disclosed in JP-B-5-8065. A conventional extrusion-type coating head 10 disclosed therein is constituted by a front edge block 11 disposed close to an upstream web support roller (not shown) and having a convex-curved front edge surface 11a, a doctor edge block 12 disposed close to a downstream-side web support roller (not shown) and having a convex-curved doctor edge surface 12a receding as a whole with a slight difference in level from the front edge surface 11a, and a slot 14 for dividing the front edge block 11 and the doctor edge block 12 at a slight space so as to supply a coating composition A from a pocket portion 13 continuously.

Further, the coating head 10 has a size relation of $\theta_1 < \theta_2 < 180°$ between angles $\theta_1$ and $\theta_2$. The angle $\theta_1$ is formed between a first tangent $t_1$ touching the front edge surface 11a at a slot-outlet end portion of the front edge surface 11a and a second tangent $t_2$ touching the doctor edge surface 12a at a rear end portion of the doctor edge surface 12a. The angle $\theta_2$ is formed between the first tangent $t_1$ and a third tangent $t_3$ which is drawn from the slot-outlet end portion of the front edge surface 11a so as to touch the doctor edge surface 12a. In addition, the front edge surface 11a has such a relative position relationship that the front edge surface 11a is close to the lower surface of a flexible support W on the upstream-side web support roller side.

The flexible support W which has passed through the upstream-side web support roller is continuously conveyed in the direction of the arrow C toward the downstream-side web support roller so as to be wound on the front edge surface 11a, the outlet of the slot 14 and the doctor edge surface 12a sequentially. During this conveyance, a slight gap enough to prevent the coating composition A from overflowing from the front edge surface 11a to the upstream side is provided between the flexible support W and the front edge surface 11a. This gap is provided by the effect of a combination of various factors such as the supply rate and fluid pressure of the coating composition A supplied to the vicinity of the outlet of the slot 14, the web tension, the shapes of the front edge surface 11a and the doctor edge surface 12a based on the size relation of $\theta_1 < \theta_2 < 180°$, and so on.

In addition, a meniscus of the coating composition A is formed in the gap so as to prevent the invasion of foreign matters adhering to the flexible support w conveyed from the upstream side and the air entrained on the flexible support W. On the other hand, on the lower surface of the flexible support W leaving the rear end portion of the doctor edge surface 12a, a coating film the thickness of which is reduced to about 10 μm in a wet state is obtained by the application effect of a trap formed, near a coating point, by the above-mentioned difference in level.

On the other hand, the coating head disclosed in JP-B-4-5508 is designed to have a front edge surface different from the above-mentioned front edge surface 11a in the extrusion-type coating head 10 disclosed in JP-B-5-8065. According to the coating head disclosed in JP-B-4-5508, a surplus of the coating composition A is made to overflow to the upstream outside of the coating head through a slight gap between the front edge surface and the flexible support W so that foreign matters adhering to the flexible support W and the air entrained on the flexible support W are prevented from invading a coating film of the coating composition A.

Further, in this coating head, two doctor edge blocks are made to be adjacent to a front edge block through a slot so that another coating composition is applied as another coating film onto the coating film of the coating composition A which is in a wet state on the lower surface of the flexible support W.

However, also in this method, it was difficult to cope with the case where it was intended to make a further coating layer thinner, for example, to be not thicker than 10 μm in a so-called wet state.

This is because the free surface on the upstream side becomes unstable due to the reduction in thickness and the air is conspicuously mixed into the coating layer so that a failure such as so-called thin coating streaks or the like occurs.

Therefore, there is adopted a method in which the fluid pressure on the doctor edge is increased by reducing the curvature radius of the doctor edge or by increasing the tension of the flexible support so that the air is restrained from mixing into the coating film to some extent. On the contrary, however, there arose a problem that the free surface did not stay in a die-edge leading end portion but moved to the upstream side so that the film was made uneven.

In addition, with reduction of the thickness of the coating layer, the distance between the front edge and the flexible support, which is essentially kept to be extremely narrow is made smaller, so that it is inevitable that the flexible support is brought into contact with the front edge due to a minute change of speed or tension of the flexible support, the surface characteristic of the flexible support, and so on.

As a result, the support surface is shaved or is deformed locally so that there may occur a bad influence such as coating streaks, injures for the coating layer or the support itself, and so on.

On the other hand, in the coating head disclosed in JP-B-4-5508, as the speed is made higher and the coating layer is made thinner, the coating composition A unevenly overflows with unsteady vibration unless the flow rate of surplus of the coating composition A overflowing from the front edge surface to the upstream outside of the coating head and the distance between the flexible support W and the front edge surface are established properly. As a result, a streaky defect is apt to be caused by coating unevenness or invasion of entrained air or foreign matters into the coating film.

SUMMARY OF THE INVENTION

It is an object of the present invention to solve the foregoing problems in the conventional art and to provide a coating method in which coating films can be kept superior in quality, can be produced at a high speed, and can be reduced in thickness.

The foregoing object of the present invention is achieved by the following configuration.

(1) In a coating method in which an extrusion-type coating head having a front edge surface and at least one doctor edge surface is pressed onto a flexible support laid and running between support rollers so as to coat the flexible support with a coating composition ejected from at least one slot to thereby provide at least one layer of coating film; the coating film is provided in the state where 10% to 80% of first coating composition is made to overflow through a gap formed between the support and the front edge.

(2) In the coating method defined in the above aspect (1), the coating film is provided in the state where the shortest distance between a tangent touching an outer circumferential surface of an upstream support roller and a first doctor edge surface and the front edge surface in a front edge block is set to be not shorter than 10 μm.

(3) In the coating method defined in the above aspect (1), the coating film is provided in the state where the first coating composition adjusted to have a static viscosity of not less than 1 poise and a viscosity of not more than 50 centipoises at a shear rate of 10,000 $sec^{-1}$ is made to overflow.

In a coating method according to the present invention, a coating film is provided in the state where 10 to 80% of the discharge amount of a first coating composition is made to overflow through a gap formed between an above-mentioned support and an above-mentioned front edge surface. Accordingly, the front edge and the support are not in direct contact with each other so that not only the support is prevented from being shaved but also the air is not mixed into the coating film. As a result, thin and even coating can be performed. Then, the viscosity of the coating composition is important to keep the amount of the overflow of the coating composition uniform and stable. By increasing the so-called static viscosity measured by a Brookfield viscometer, an effect of preventing the air from mixing into the coating film at a doctor edge portion is obtained.

Further, an edge at the downstream end of the first doctor edge surface has an effect of preventing the disorder of the interface between a layer formed by the coating composition and another layer overlapping the layer.

DETAILED DESCRIPTION OF THE INVENTION

Figure 1:
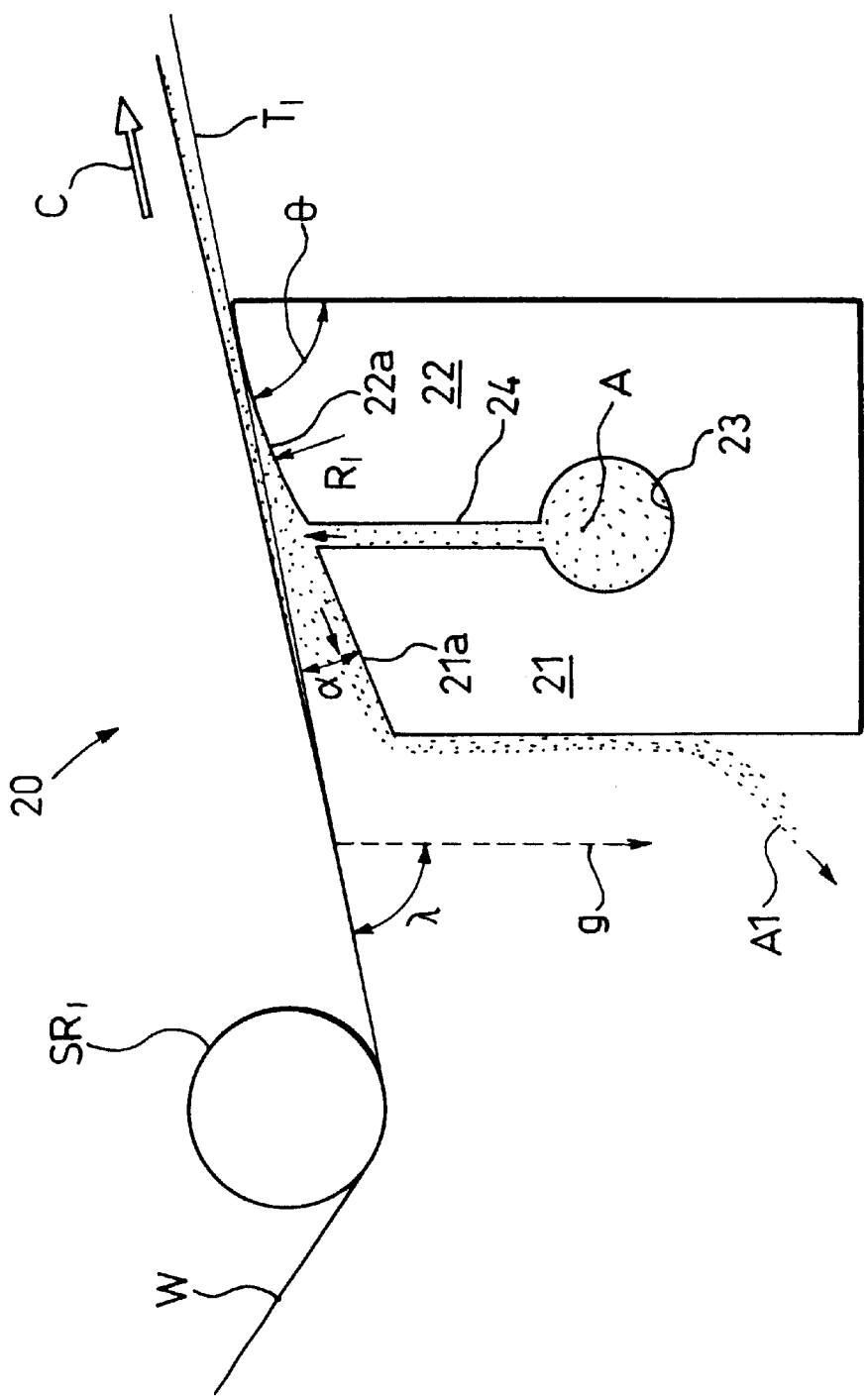
FIG. 1 is a schematic view showing a main part of an extrusion-type single-layer coating apparatus for carrying out a coating method according to the present invention.
Figure 2:
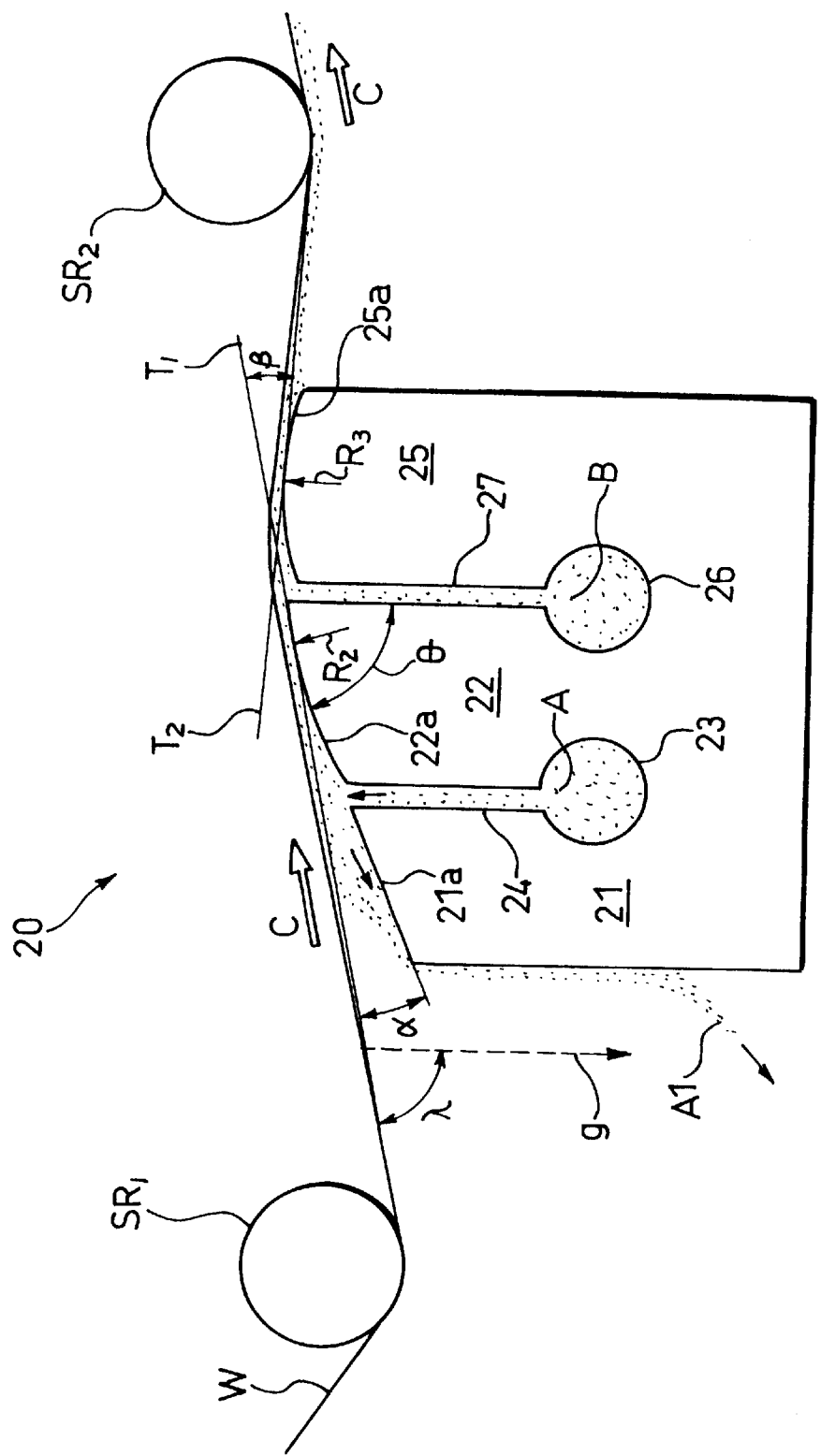
FIG. 2 is a schematic view showing a main part of an extrusion-type two-layer coating apparatus for carrying out a coating method according to the present invention.

Detailed description will be made below about an embodiment of a coating method according to the present invention with reference to the accompanying drawings. Each of FIGS. 1 and 2 is a schematic view showing a main part of an extrusion-type coating apparatus 20 for carrying out the coating method according to the present invention. The coating apparatus 20 of FIG. 1 shows a single-layer coating apparatus, and the coating apparatus 20 of FIG. 2 shows a two-layer coating apparatus.

In the coating method according to the present invention using the coating apparatus 20 of FIG. 1, a long-size flexible band-like support W (hereinafter referred to as "web") is supported on the outer circumferential surface of an upstream-side web support roller $SR_1$ and conveyed continuously in the direction of the arrow C. First, the lower surface of the web W approaches a front edge surface 21a of a front edge block 21 in the extrusion-type coating apparatus 20. Successively, the web W passes through an outlet of a slot 24 from which a first coating composition A pressure-delivered through a pocket portion 23 is supplied upward successively. Next, after coming closest to a first convex-curved doctor edge surface 22a of a first doctor edge block 22, the web W is conveyed toward the outer circumferential surface of a downstream-side web support roller (not shown) so as to leave the first doctor edge surface 22a.

The first coating composition A uses magnetic substance fluid dispersion or nonmagnetic substance fluid dispersion in accordance with the purpose of use. Description will be made on the assumption that the first coating composition A is magnetic substance fluid dispersion.

Generally, examples of the web W in the present invention include a flexible band-like substance or a band-like substance in which the first-mentioned flexible band-like substance is used as base material and is provided with a processed layer on its surface. The flexible band-like substance has a width in a range of from 0.3 to 3 m, a length in a range of from 45 to 10,000 m and a thickness in a range of from 2 to 200 μm, and is constituted by: a plastic film of, for example, polyethylene terephthalate, polyethylene-2,6-naphthalate, cellulose diacetate, cellulose triacetate, cellulose acetate propionate, polyvinyl chloride, polyvinylidene chloride, polycarbonate, polyimide, polyamide, etc.; paper; paper coated or laminated with α-polyolefin with carbon number in a range of from 2 to 10 such as polyethylene, polypropylene, ethylene-butene copolymer, etc.; metal foil such as aluminum, copper, tin, etc.; and so on.

In addition, it is possible to use the above-mentioned web W which is coated with a functional layer such as a bonding layer or the like, and dried or solidified in advance.

Components of the coating compositions may be selected desirably in accordance with the function of a product. In the coating method according to the present invention, liquid used as the coating composition A which is a lower layer may be different in composition from liquid used as the coating composition B applied so as to overlap the coating composition A. For example, in the case where the present invention is applied to coating on a magnetic recording medium, inorganic powder fluid dispersion can be used as the coating composition A while magnetic powder fluid dispersion or the like is used as the coating composition B, or liquids in which magnetic substances having different characteristics have been dispersed may be used as the coating compositions A and B respectively.

Ferromagnetic fine powder is a main component of the above-mentioned magnetic substance fluid dispersion. Well-known ferromagnetic fine powder of $\gamma$-$Fe_2O_3$, $\gamma$-$Fe_2O_3$ containing Co, $Fe_3O_4$, $Fe_3O_4$ containing Co, $\gamma$-$FeO_x$, $\gamma$-$FeO_x$ (X=1.33 to 1.50) containing Co, $CrO_2$, a Co—Ni—P alloy, a Co—Ni—Fe—B alloy, an Fe—Ni—Zn alloy, an Ni—Co alloy, a Co—Ni—Fe alloy, and so on, may be used. The particle size of such ferromagnetic fine powder is in a range of from about 0.005 µm to about 1 µm in length, and the ratio of axial length to axial width is in a range of from about 1/1 to about 50/1. In addition, the specific surface area of such ferromagnetic fine powder is in a range of from about 1 $m^2/g$ to about 70 $m^2/g$.

Incidentally, in case of using nonmagnetic substance fluid dispersion, it is used in the same manner as the magnetic substance fluid dispersion. For example, used is inorganic compound powder such as metallic oxide, metallic carbonate, metallic sulfate, metallic nitride, metallic carbide, metallic sulfide and the like. Specifically, titanium oxide, aluminum oxide, cerium oxide, tin oxide, zinc oxide, zirconium oxide, copper oxide, tungsten carbide, silver oxide and the like can be used. As the nonmagnetic powder, the moisture content is 0.1% to 5%, preferably 0.2% to 3%, and pH is 2 to 11. The shape of the nonmagnetic powder can be any one of needle-shape, spherical-shape, cubic-shape and the like. The nonmagnetic powder is not necessary to be 100% pure one. It's surface may be processed by any other compound in accordance with a purpose. At this time, the effect of the nonmagnetic powder is not reduced if the purity is 70% or more. For example, in case of using titanium oxide, the surface is generally processed by almina. The ignition loss is preferably 20% or less.

Further, plate-like hexagonal barium ferrite may be also used as the ferromagnetic fine powder. The particle size of the barium ferrite is in a range of from about 0.001 µm to about 1 µm in diameter, and the thickness is in a range of from ½ to 1/20 of the diameter. The specific gravity of the barium ferrite is in a range of from 4 g/cc to 6 g/cc, and the specific surface area is in a range of from 1 $m^2/g$ to 70 $m^2/g$.

A binder is used together with the ferromagnetic fine powder in the magnetic substance fluid dispersion. Examples of the binder to be used include well-known thermoplastic resin, thermosetting resin, reactant type resin, and any mixture of those resins.

The softening temperature of the thermoplastic resin is not higher than 150° C., the average molecular weight is in a range of from 10,000 to 300,000, and the degree of polymerization is in a range of from about 50 to about 2,000. Examples of the thermoplastic resin include polyvinyl chloride-acetate copolymer, vinyl chloride-vinylidene chloride copolymer, vinyl chloride-acrylonitrile copolymer, acrylate-acrylonitrile copolymer, acrylate-vinylidene chloride copolymer, acrylate-styrene copolymer, methacrylate-acrylonitrile copolymer, methacrylate-vinylidene chloride copolymer, methacrylate-styrene copolymer, urethane elastomer, nylon-silicon resin, nitrocellulose-polyamide resin, polyvinyl fluoride, vinylidene chloride-acrylonitrile copolymer, butadiene-acrylonitrile copolymer, polyamide resin, polyvinyl butyral, cellulose derivative (cellulose acetate butyrate, cellulose diacetate, cellulose triacetate, cellulose propionate, nitrocellulose, etc.), styrene-butadiene copolymer, polyester resin, chlorovinyl ether-acrylate copolymer, amino resin, various kinds of synthetic rubber thermoplastic resins; any mixture of those materials; and so on.

The molecular weight of the thermosetting resin or the reactant type resin is not more than 200,000 in the state of a coating composition. When a composition for forming a magnetic layer is applied, dried and then heated, such resin makes a reaction such as condensation, addition or the like so that the molecular weight can become infinitely large. In addition, of these resins, resin which does not soften or melt before the resin is thermally decomposed is preferable.

Specifically, examples of such resin include phenolic resin, epoxy resin, hardening type polyurethane resin, urea resin, melamine resin, alkyd resin, silicon resin, reactant type acrylic resin, epoxy polyamide resin, nitrocellulose melamine resin, a mixture of polymeric polyester resin and isocyanate prepolymer, a mixture of methacrylate copolymer and di-isocyanate prepolymer, a mixture of polyester polyol and polyisocyanate, urea-formaldehyde resin, a mixture of monomeric glycol, polymeric diol and triphenylmethane tri-isocyanate, polyamide resin; any mixture of these materials; and so on. Ferromagnetic fine powder, a solvent, a dispersant, a lubricant, an abrasive and an antistatic additive as additives, a nonmagnetic support and so on, dispersed in the binder which have been used in the background art are used similarly also in the present invention.

Examples of the dispersant include fatty acid having a carbon number in a range of from 12 to 18 ($R_1COOH$, $R_1$ designates an alkyl or alkenyl group having a carbon number in a range of from 11 to 17) such as caprilic acid, capric acid, lauric acid, myristic acid, palmitic acid, stearic acid, oleic acid, elaidic acid, linoleic acid, linolenic acid, stearolic acid, etc.; metallic soap of alkali metal (Li, Na, K, etc.) or alkali-earth metal (Mg, Ca, Ba) of the above-mentioned fatty acid; a fluorine-containing compound of the above-mentioned fatty ester; amide of the above-mentioned fatty acid; polyalkylene oxide alkylphosphate ester; lecithin; trialkyl polyolefine oxy quaternary ammonium salt (the carbon number of alkyl is in a range of from 1 to 5, olefine is ethylene, propylene, or the like); and so on. Other than these materials, higher alcohol having a carbon number of not smaller than 12, sulfate and so on may be used.

Although the above-mentioned dispersant shows an effect of lubricant, examples of the lubricant may include: conductive fine powder of silicon oil such as dialkyl polysiloxane (the carbon number of alkyl is in a range of from 1 to 5), dialkoxy polysiloxane (the carbon number of alkoxy is in a range of from 1 to 4), monoalkyl monoalkoxy polysiloxane (the carbon number of alkyl is in a range of from 1 to 5, and the carbon number of alkoxy is in a range of from 1 to 4), phenyl polysiloxane, phloroalkyl polysiloxane (the carbon number of alkyl is in a range of from 1 to 5), etc., graphite and so on; inorganic fine powder such as molybdenum disulfide, tungsten dioxide, etc.; plastic fine powder such as polyethylene, polypropylene, polyethylene-vinyl chloride copolymer, polytetrafluoroethylene, etc.; α-olefin polymer; unsaturated fatty hydrocarbon which is in a fluid state at room temperature (α-olefin in which a double bond bonds with an end carbon, and the carbon number is about 20); fatty esters of monobasic fatty acid having a carbon number in a range of from 12 to 20 and monovalent alcohol having a carbon number in a range of from 3 to 12; fluorocarbons; and so on.

Examples of the abrasive include molten alumina, silicon carbide, chromium oxide ($Cr_2O_3$), corundum, artificial corundum, diamond, artificial diamond, garnet, emery (main components: corundum and magnetite), and so on.

Examples of the antistatic additive include conductive fine powder such as carbon black, carbon black graft polymer, etc.; natural surface active agents such as saponin; nonionic surface active agents such as alkylene oxide series, glycerin series, glycidol series, etc.; cation surface active agents such as higher alkylamines, quaternary ammonium salts, heterocyclic compounds of pyridine or the like, phosphonium or sulfonium salts, etc.; anion surface active agents containing an acidic group such as a carboxylic group, a sulfonic group, a phosphoric group, a sulfate group, a phosphate group, etc.; amphiprotic active agents such as amino acids, aminosulfonic acids, sulfuric or phosphoric esters of aminoalcohol, etc.; and so on.

Examples of the organic solvent used for magnetic substance fluid dispersion include ketone series such as acetone, methyl ethyl ketone, methyl isobutyl ketone, cyclohexanone, etc.; ester series such as methyl acetate, ethyl acetate, butyl acetate, ethyl lactate, glycol acetate monoethyl ether, etc.; tar series (aromatic hydrocarbon) such as benzene, toluene, xylene, etc.; chlorinated hydrocarbon such as methylene chloride, ethylene chloride, carbon tetrachloride, chloroform, ethylene chlorohydrin, dichlorbenzene, etc.; and so on.

The amount of the above-mentioned organic solvent is two to three times as large as that of the magnetic fine powder. With respect to 100 parts by weight of the binder, the dispersant is in a range of from 0.5 to 20 parts by weight, the lubricant is in a range of from 0.2 to 20 parts by weight, the abrasive is in a range of from 0.5 to 20 parts by weight, the conductive fine powder used as the antistatic additive is in a range of from 0.2 to 20 parts by weight, and the surface active agent used as the antistatic additive is in a range of from 0.1 to 10 parts by weight. The above-mentioned magnetic powder, binder, dispersant, lubricant, abrasive, antistatic additives, solvent, and so on are kneaded so as to be magnetic substance fluid dispersion.

It is necessary to carefully adjust the viscosity of the coating composition A for forming a layer closest to the web W. The amount of solids or the amount of the binder is adjusted so that so-called static viscosity measured by a Brookfield viscometer becomes not lower than 1 poise and viscosity at a shear rate of 10,000 $sec^{-1}$ measured by a Rotovisko viscometer becomes not higher than 50 centipoises.

In the case where at least two layers are applied simultaneously, the viscosity of coating compositions are adjusted so that any difference in viscosity at a shear rate of 10,000 $sec^{-1}$ between the coating compositions become within 10 centipoises. As a result, it is possible to reduce the disorder of any interface between layers.

The coating apparatus 20 shown in FIG. 1 applicable to the method according to the present invention is characterized in that with respect to the lower surface of the web W which is conveyed along a first tangent $T_1$ touching the upstream-side support roller $SR_1$ and the first doctor edge surface 22a, with web tension set in a range of from 5 kg/m to 50 kg/m, a substantially flat slope of the front edge surface 21a is set to recede from the upstream-side support roller $SR_1$ under the first tangent $T_1$.

In the method according to the present invention using the above-mentioned front edge surface 21a, a coating film of the first coating composition A having a desired thickness is provided by the metaling effect of the first doctor edge surface 22a, while 10 to 80% of the total amount of the first coating composition A supplied is made to overflow through the gap between the front edge surface 21a and the lower surface of the web W.

The front edge is not limited to such a flat surface as shown in FIG. 1, but may be a substantially circular surface.

The amount of an overflow A1 of the first coating composition A is set to be in a range of from 10 to 80% of the total amount of the first coating composition A supplied. As a result, the meniscus of the first coating composition A on the front edge surface 21a and the overflow A1 overflowing along the upstream-side outer surface of the front edge block 21 from the front edge surface 21a are kept in such a stable state that, even if the amount of the overflow is reduced to a minimum requirement, not only unsteady vibration causing coating unevenness failure is restrained from being generated but also the entrained air and foreign matters to the web W are effectively prevented from invading the coating film. Thus, the thickness of the coating film can be reduced.

In addition, by adjusting the amount of the overflow A1 of the coating composition A to be in a range of from 10 to 80%, preferably 20 to 70%, more preferably 30 to 70%, it is possible to control the thickness of the coating film.

The coating film thickness can be controlled by adjusting the web tension, a gap g between the first tangent $T_1$ and the front edge other than the amount of the overflow A1. The gap g can be adjusted by adjusting the positional relationship between the upstream-side support roller and the coating apparatus or adjusting the difference in height between the front edge and the first doctor edge.

In addition, it is preferable that at least a part of the doctor edge surface on the downstream side projects over a tangent drawn from the downstream end of the first doctor edge to the circumferential surface of the support roller located just after the coating apparatus, which is in contact with the support, because the thin film characteristic of an upper layer is improved.

Further, in the method according to the present invention, the web W which has passed on the first doctor edge surface 22a is conveyed toward the downstream side while leaving an edge angle θ of a downstream end portion of the first doctor edge surface 22a set in a range of from 40 to 140° with respect to the above-mentioned first tangent $T_1$. As a result, the coating film surface of the first coating composition A applied onto the lower surface of the web W leaves the above-mentioned edge angle θ of the downstream end portion in a stable state so that coating streak failure is restrained from being generated. Then, the angle α of the web approaching the coating apparatus can be easily adjusted and set by moving the axial center of the upstream-side support roller $SR_1$ up/down.

In the method according to the present invention using the coating apparatus 20 shown in FIG. 2, the web W leaving the above-mentioned edge angle θ of the downstream end portion of the first doctor edge surface 22a is passed through a convex-curved surface of the second doctor edge surface 25a while the coating film of the first coating composition A in a wet state is coated with a coating film of another second coating composition B so as to overlap the coating film of the second coating composition B along a second tangent $T_2$ drawn from the downstream-side support roller $SR_2$ to touch a second doctor edge surface 25a of the second doctor edge block 25. Then, the web W is conveyed toward the downstream-side support roller $SR_2$ while leaving a downstream end portion of the second doctor edge surface 25a at a web leaving angle β set in a range of from 40 to 140° between the above-mentioned tangent $T_1$ drawn from the upstream-side support roller $SR_1$ to touch the first doctor edge surface 22a and the above-mentioned second tangent $T_2$ drawn from the downstream-side support roller $SR_2$ to touch the second doctor edge surface 25a. In such a manner, the edge angle θ of the downstream end portion of the first doctor edge surface 22a defines a boundary surface between the two layers clearly while the web leaving angle β in the second doctor edge surface 25a restrains the web W from flapping running.

Although the present invention has been described about the case where each of the first and second coating compositions A and B is a magnetic substance fluid dispersion consisting of an organic solvent and a binder having compatibility with each other, the first and second coating compositions A and B may be the above-mentioned non-magnetic substance fluid dispersion and magnetic substance fluid dispersion respectively. The compatibility between the organic solvent and the binder, the mutual surface tension, the interfacial tension, the spreading coefficient and so on are adjusted suitably in each of the coating compositions so that respective coating films can be applied as thin layers in a wet state so as to overlap each other.

In a coating method according to the present invention, a coating film is provided in the state where 10 to 80% of the discharge amount of a first coating composition is made to overflow through a gap formed between an above-mentioned support and an above-mentioned front edge surface. Accordingly, the front edge and the support are not in direct contact with each other so that not only the support is prevented from being shaved but also the air is not mixed into the coating film. As a result, even if the amount of the overflow of the first coating composition is reduced to a minimum requirement, not only unsteady vibration causing the above-mentioned coating unevenness failure is restrained from being generated but also the entrained air and foreign matters onto the web is effectively prevented from invading the coating film, so that the coating film can be kept in an extremely stable state and applied to be thin and even. Then, the viscosity of the coating composition is important to keep the amount of the overflow of the coating composition uniform and stable. By increasing the so-called static viscosity measured by a Brookfield viscometer, an effect of preventing the air from mixing into the coating film at a doctor edge portion is obtained.

Further, an edge at the downstream end of the first doctor edge surface has an effect of preventing the disorder of the interface between a layer formed by the coating composition and another layer overlapping the layer.

EXAMPLES

The novel effects of the method according to the present invention will be made clearer by examples.

Examples 1 to 3, and Comparative Examples 1 to 3

Support: polyethylene terephthalate (thickness 60 $\mu$m)
coating speed: 300 m/min
tension: 20 kgf/m (width)
die No.1:
    Examples a=40 $\mu$m, $\gamma$=15°, g=15 $\mu$m
    Comparative Examples a=25 $\mu$m, $\gamma$=15°, g=0

A coating composition obtained by mixing the following components with a continuous kneader, then adding methyl ethyl ketone of 40 parts to fluid dispersion obtained by dispersion with a sand mill, and filtering the fluid dispersion by use of a filter having an average hole diameter of 1 $\mu$m was used as a coating composition.

| Coating Composition 1 | |
|---|---|
| ferromagnetic metal powder: | |
| composition (Fe/Zn/Ni = 92/4/4) | 100 parts |
| average major axis length | 0.2 $\mu$m |
| major-to-minor axial ratio | 10 |

| -continued | |
|---|---|
| Coating Composition 1 | |
| vinyl chloride copolymer: | 12 parts |
| degree of polymerization | 300 |
| methyl ethyl ketone: | 90 parts |
| cyclohexane: | 100 parts |
| static viscosity: | 10 poise |
| high shear viscosity: | 20 centipoises |

Figure 3:
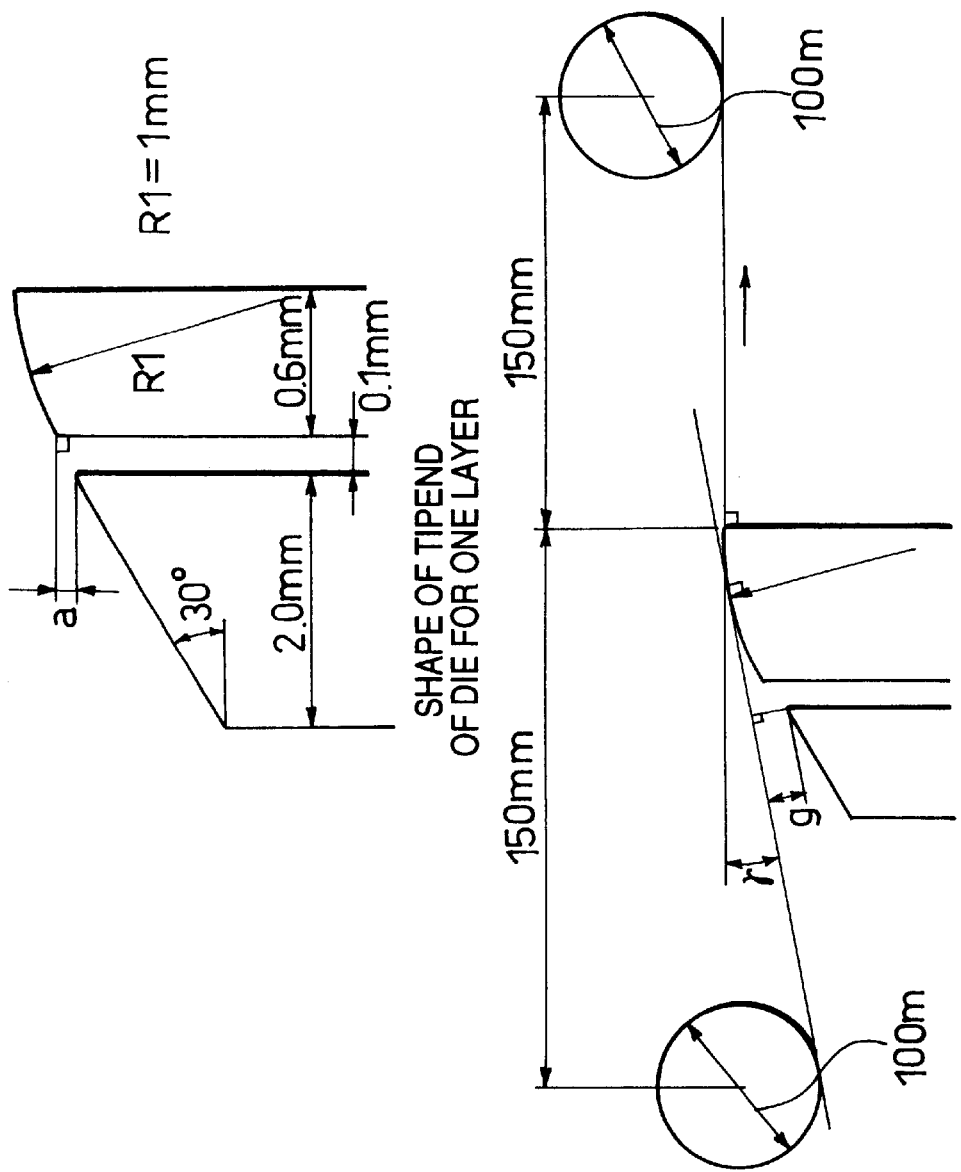
FIG. 3 is a schematic view showing a main part of a coating apparatus used in Examples.

In the specification shown in FIG. 3, coating was performed while the overflow ratio ((overflow amount/discharge amount)×100) and the wet coating film thickness were changed. In Comparative Example 1, coating was performed by a method disclosed in JP-B-5-8065. The result shown in Table 1 was obtained by experiments.

TABLE 1

| | overflow ratio (%) | wet coating film thickness ($\mu$m) | surface characteristic |
|---|---|---|---|
| Example 1 | 10 | 1.2 | superior |
| Example 2 | 50 | 1.8 | superior |
| Example 3 | 80 | 2.4 | superior |
| Comparative Example 1 | 0 | 9.5 (limit as thin layer) | superior |
| Comparative Example 2 | 5 | Immeasurable due to unevenness | unevenness generation |
| Comparative Example 3 | 90 | Immeasurable due to unevenness | unevenness generation |

As shown in Table 1, thin and even coating could be performed in Examples 1 to 3, while only coating in which the thickness of the coating film was reduced to 9.5 $\mu$m at the maximum could be performed in Comparative Example 1 and unevenness appeared in the surface characteristic in Comparative Examples 2 and 3.

Examples 4 to 6, and Comparative Examples 4 to 6

Support: polyethylene terephthalate (thickness 6 $\mu$m)
coating speed: 100 m/min
tension: 15 kgf/m (width)
die No.2:
    Examples a=30 $\mu$m, $\gamma$=10°, g=23 $\mu$m $\phi$=5°, h=20 $\mu$m
    Comparative Examples a=30 $\mu$m, $\gamma$=15°, g=0, $\phi$=5°, h=20 $\mu$m Coating compositions obtained by mixing the following components with a continuous kneader, then adding methyl ethyl ketone of 40 parts to fluid dispersions obtained by dispersion with a sand mill, and filtering the fluid dispersions by use of a filter having an average hole diameter of 1 $\mu$m were used as coating compositions.

| | |
|---|---|
| lower layer (coating composition A): | Coating Composition 2 |
| upper layer (coating composition B): | Coating Composition 1 |
| upper layer wet coating thickness | 2 $\mu$m |
| Coating Composition 2 | |
| TiO$_2$ powder: | 100 parts |
| average particle size | 0.05 $\mu$m |
| vinyl chloride copolymer: | 10 parts |
| degree of polymerization | 300 |
| cyclohexane: | 200 parts |
| static viscosity: | 2 poise |
| high shear viscosity: | 40 centipoises |

Figure 4:
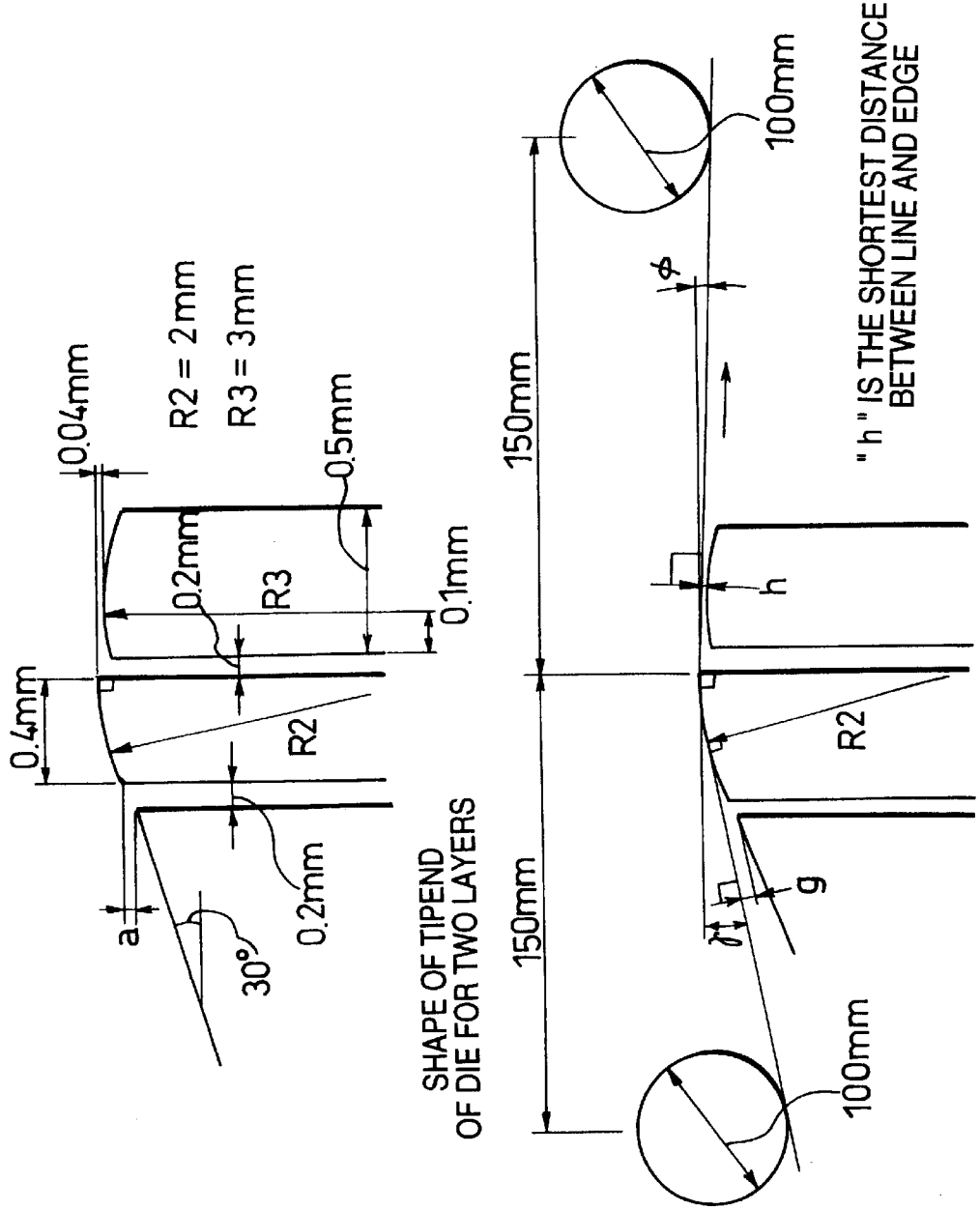
FIG. 4 is a schematic view showing a main part of a coating apparatus used in Examples.

In the specification shown in FIG. 4, coating was performed while the overflow ratio and the wet coating film thickness were changed. In Comparative Example 4, coating was performed by a method disclosed in the specification of Japanese Patent No. 2581975. The result shown in Table 2 was obtained by experiments.

TABLE 2

|  | Overflow ratio (%) | wet coating film thickness ($\mu$m) | surface characteristic |
| --- | --- | --- | --- |
| Example 4 | 10 | 0.8 | superior |
| Example 5 | 50 | 1.5 | superior |
| Example 6 | 80 | 2 | superior |
| Comparative Example 4 | 0 | 9.8 (limit as thin layer) | superior |
| Comparative Example 5 | 5 | immeasurable due to unevenness | unevenness generation |
| Comparative Example 6 | 90 | immeasurable due to unevenness | unevenness generation |

As shown in Table 2, thin and even coating could be performed in Examples 4 to 6, while only coating in which the thickness of the coating film was reduced to 9.8 $\mu$m at the maximum could be performed in Comparative Example 4 and unevenness appeared in the surface characteristic in Comparative Examples 5 and 6.

Example 7

By use of a die having a tip shape shown in FIG. 3, coating was performed under the conditions shown in FIG. 3 while the height a and the angle $\theta$ were changed so that the gap g was changed, and the support tension was adjusted to be in a range of from 10 to 20 kgf/m (width) so that a 1.0 $\mu$m-thick coating film in a wet state was applied onto 6 $\mu$m-thick polyethylene terephthalate at a coating speed of 200 m/min.

The coating was performed at an overflow ratio of 50% by use of Coating Composition 1. The result is shown in Table 3.

TABLE 3

| Height a | angle $\theta$ | Gap g | state of coating surface |
| --- | --- | --- | --- |
| 30 $\mu$m | 12° | 17 $\mu$m | superior |
| 30 $\mu$m | 14° | 10 $\mu$m | superior |
| 30 $\mu$m | 15° | 5 $\mu$m | with slight unevenness |
| 35 $\mu$m | 15° | 10 $\mu$m | superior |
| 40 $\mu$m | 15° | 15 $\mu$m | superior |

As shown in Table 3, although there appeared slight unevenness on the coating surface when the gap g was 5 $\mu$m, the surface characteristic was superior when the gap g was 17 $\mu$m, 10 $\mu$m or 15 $\mu$m.

Example 8

While the height a and the angle $\theta$ were set to be 40 $\mu$m and 15° respectively in a die shown in FIG. 4, static viscosity and high shear viscosity were measured upon various fluids in which the compounding ratios of $\gamma$-Fe$_2$O$_3$ powder, vinyl chloride copolymer and methyl ethyl ketone of the materials of Coating Compositions 1 and 2 were changed, and the coating suitability of each fluid was examined. Then, the support was of polyamide with a thickness of 4 $\mu$m, a tension was 10 kgf/m (width) and a coating speed was 150 m/min. The result is shown in FIG. 5.

Figure 5:
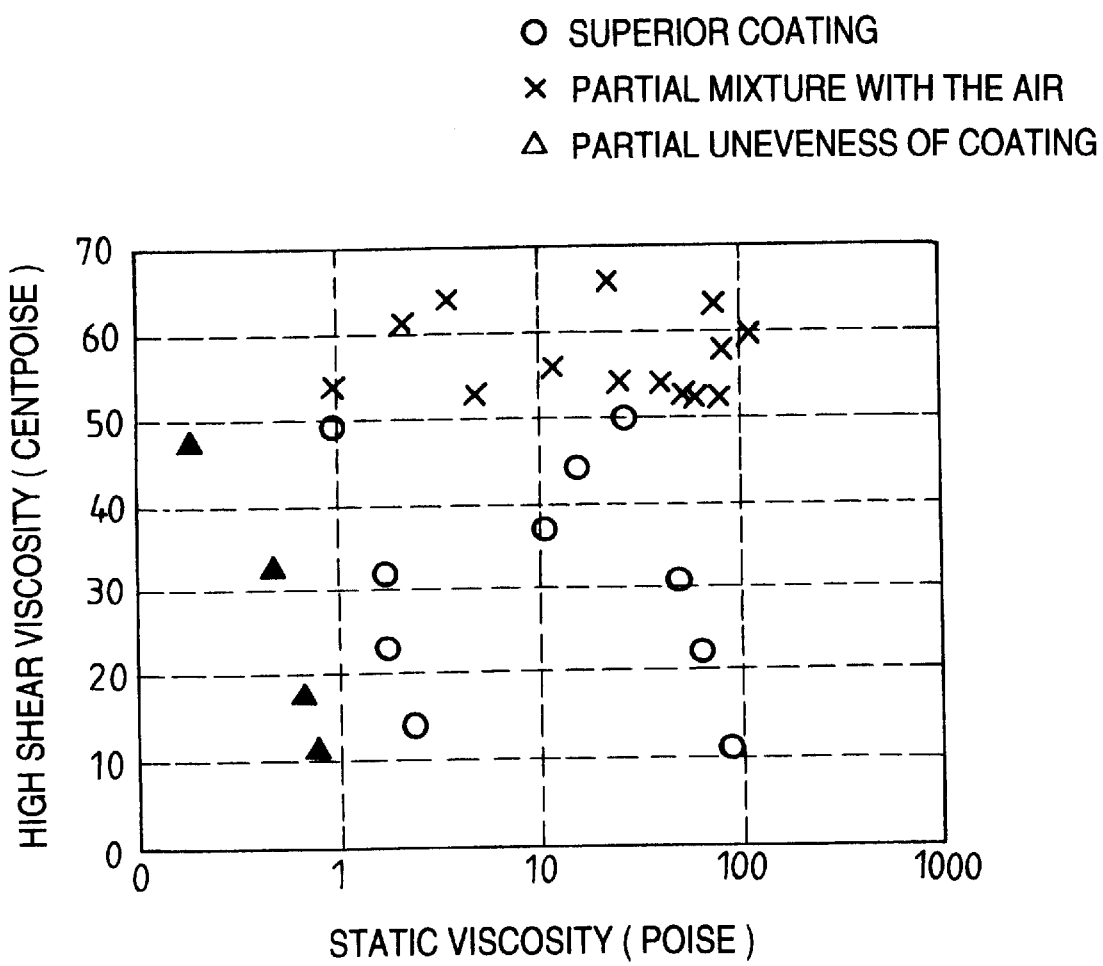
FIG. 5 is a graph showing a coating surface characteristic in accordance with the distribution of viscosity of a coating composition in Examples.
Figure 6:
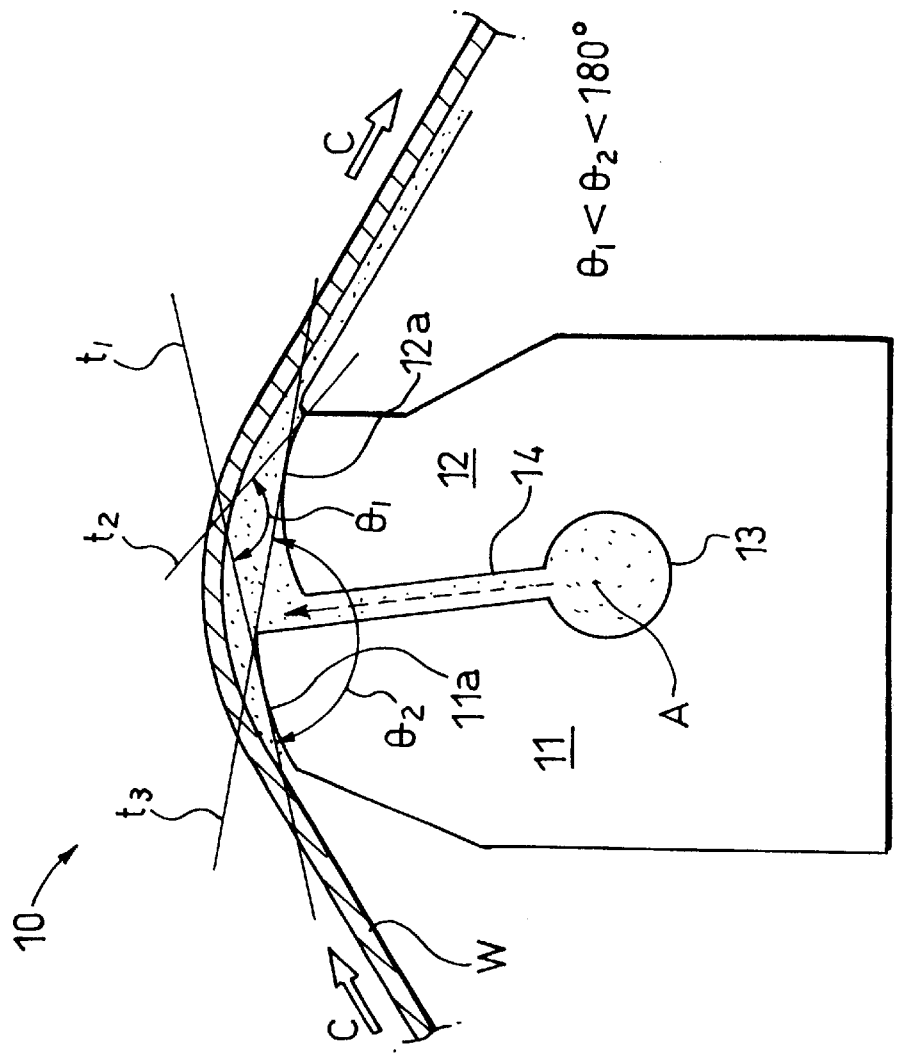
FIG. 6 is a schematic view showing a main part of a background-art coating apparatus.

As shown in FIG. 5, coating compositions each having a static viscosity in a range of from 1 to 100 poise and a high shear viscosity in a range of from 10 to 50 centipoises were applied excellently. On the other hand, in coating compositions each having a static viscosity of lower than 1 poise and a high shear viscosity of lower than 50 centipoises, coating unevenness appeared partially on the coating surface. In coating compositions each having a static viscosity in a range of from 1 to 100 poise and a high shear viscosity of higher than 50 centipoises, the air was mixed into the coating surface partially.

What is claimed is:

1. A coating method comprising laying and running a flexible support between support rollers, pressing an extrusion coating head having a front edge surface and at least one doctor edge surface onto said flexible support, ejecting a coating composition from at least one slot located between the front edge surface and a doctor edge surface to thereby provide at least one layer of coating film to coat said flexible support;

wherein said coating film is provided in an amount where 10% to 80% of a first coating composition is made to overflow without unsteady vibration through a gap formed between said support and said front edge surface, and wherein the layer of the coating film is formed in a thickness of 10 $\mu$m or less in a wet state.

2. The coating method according to claim 1, wherein said coating film is provided in a state where a shortest distance between a first tangent touching an outer circumferential surface of an upstream support roller and a first doctor edge surface and said front edge surface in a front edge block is set to be not shorter than 10 $\mu$m.

3. The coating method according to claim 1, wherein said coating film is provided in the state where said first coating composition adjusted to have a static viscosity of not less than 1 poise and a viscosity of not more than 50 centipoises at a shear rate of 10,000 sec$^{-1}$ is made to overflow.

4. The coating method according to claim 3, wherein said static viscosity is in the range of 1 to 100 poise.

5. The coating method according to claim 3, wherein said viscosity at a shear rate of 10,000 sec$^{-1}$ is in the range of 10 to 50 poise.

6. The coating method according to claim 1, wherein an edge angle of a downstream end portion of a first doctor edge surface is in a range of from 40 to 140° with respect to a first tangent line touching an outer circumferential surface of an upstream support roller and said first doctor edge surface.

7. The coating method according to claim 1, wherein a web leaving angle is set in a range of from 40 to 140° between a first tangent line drawn from an upstream-side support roller to touch a first doctor edge surface and a second tangent line drawn from a downstream-side support roller to touch a second doctor edge surface.

8. The coating method according to claim 1, wherein said layer of the coating film is formed in a thickness of 2.4 $\mu$m or less in the wet state.

* * * * *